No. 735,611. PATENTED AUG. 4, 1903.
L. STEINBERGER.
SPHEROIDAL STRAIN.
APPLICATION FILED JAN. 14, 1903.
NO MODEL.
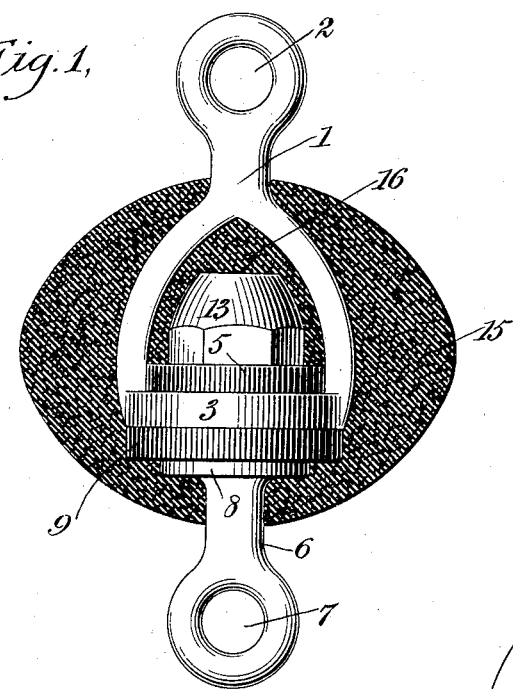
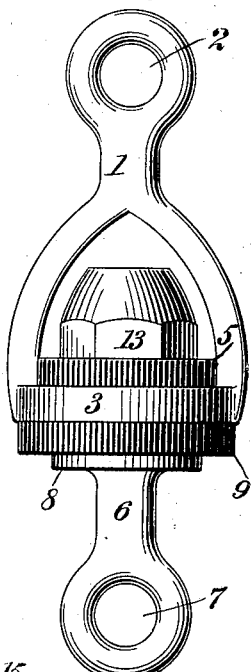
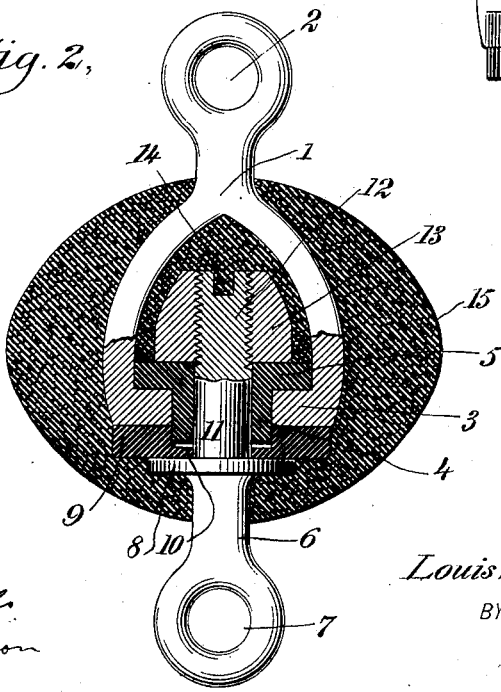
WITNESSES:
Edward Thorpe.
Walton Harrison
INVENTOR
Louis Steinberger
BY
ATTORNEYS.

No. 735,611.

Patented August 4, 1903.

UNITED STATES PATENT OFFICE.

LOUIS STEINBERGER, OF NEW YORK, N. Y.

SPHEROIDAL STRAIN.

SPECIFICATION forming part of Letters Patent No. 735,611, dated August 4, 1903.

Application filed January 14, 1903. Serial No. 139,025. (No model.)

*To all whom it may concern:*

Be it known that I, LOUIS STEINBERGER, a citizen of the United States, and a resident of the city of New York, borough of Brooklyn, in the county of Kings and State of New York, have invented a new and Improved Spheroidal Strain, of which the following is a full, clear, and exact description.

My invention relates to strains, my more particular object being to produce a neat, compact, and efficient device capable of being used either with or without the outer envelop or insulation.

Reference is to be had to the accompanying drawings, forming a part of this specification, in which similar characters of reference indicate corresponding parts in all the figures.

Figure 1 is a central section through the strain, showing certain parts in elevation. Fig. 2 is a somewhat similar view, but showing certain parts in section; and Fig. 3 is an elevation showing the device divested of or without the outer insulating covering or envelop.

A metallic link 1 is provided with an eye 2, whereby the same may be suspended, and with an annular member 3, all of these parts being integral. An insulating member, comprising a cylinder 4, having an endless flange 5 integral therewith, is provided for the purpose of engaging the annular member 3, as indicated more particularly in Fig. 2. A bolt 6, having an eye 7 and a shoulder 8, is provided for the purpose of suspending the other portions of the device.

A disk or plate 9, of insulating material, is provided with an annular aperture 10, through which passes the cylindrical portion 11 of the bolt 6, this cylindrical portion being provided with a thread 12, engaged by a revoluble nut 13. The end of the threaded portion 12 of the bolt is provided with a mutilation or slot 14. A mass 15, of insulating material, partially envelops the metallic members 1 and 6 and the insulating member 4. This mass 15, of insulating material, engages the slot 14, and thereby prevents the rotation of the bolt 6 relatively to the link 1.

To assemble the several parts, the plate 9, of insulating material, is slipped over the stem 11 and lodged against the shoulder 8. The annular insulating member, consisting of the cylindrical portion 4 and flange 5, is next dropped laterally into position, as indicated in Fig. 2. The stem 11 of the bolt 6 is next threaded through the plate 9 and cylinder 4 and is engaged by the nut 13, which is turned until its pressure forces the flange 5 and the plate 9 firmly toward each other. If desired, no outer insulation 15 need be applied, as is shown in Fig. 3. Generally, however, I deem it advisable to apply the outer insulation, which is done for the customary purpose of insulating the metallic parts and for the further purpose of protecting the same from the action of the weather.

Where no insulation is used, the nut 13 is readily accessible and may be rotated in any desired manner. When, however, the outer insulation is added, it fills the apertured slot 14 and prevents the bolt 6 from turning relatively to the link 1. The nut 13 is also prevented by the insulation 15 from turning relatively to the bolt 6. The spheroidal shape of the outer insulating member 15 is for the purpose of virtually lengthening the distance from the stem of the link 1 to that of the bolt 6, thereby making it more difficult for the current to arc across from one of these members to the other. The spheroidal shape, furthermore, tends to prevent the accumulation of water, snow, or ice upon the structure.

The structure above described is one very easily handled in machine-shops, for the reason that the link 1 can be either drop-forged or cast from malleable iron. I do not limit myself, however, to the particular method of construction; neither do I limit myself to the particular mechanical details above shown and described.

It will be noted that as the parts form a complete structure without the addition of the insulation 15 the mechanical strain or stress, as between the link 1 and the bolt 6, rests entirely upon the flange 5 and the disk 9. This being so, the annular member, consisting of the cylinder 4, the flange 5, and the disk 9, may be made of comparatively expensive insulating material, whereas the mass 15, of insulating material, may be of a comparatively cheap and inferior kind.

Having thus described my invention, I claim as new and desire to secure by Letters Patent—

1. A strain, comprising a pair of metallic members, one of which is provided with a mutilation, an insulating member disposed intermediate of said metallic members, a locking device engaging one of said metallic members and also engaging said insulating member, and a mass of insulating material partially enveloping said metallic members, said insulating member and said locking device, said mass of insulating material engaging said mutilation of said metallic member for the purpose of preventing the rotation of said metallic members relatively to each other.

2. A strain, comprising a pair of metallic members, one of which is provided with a mutilation, a locking device, and an insulating substance engaging said members and said locking device and filling said mutilation for the purpose of preventing movements of said members relatively to each other.

3. A strain comprising a link provided with a suspension member, and also with a member of annular form having a bearing-surface disposed in a plane perpendicular to the general length of said link, a bolt provided with a shoulder, said bolt being further provided at one of its ends with a suspension member and at its other end with a mutilation, a portion of said bolt being free to extend through said member of annular form, a locking device engaging said bolt, means for insulating the shoulder and body portion of said bolt from said link, and also for insulating said locking device from said bearing-surface of said link, and an insulating substance partially enveloping said link and said bolt, said insulating substance engaging said mutilation of said bolt for preventing said bolt from rotating.

4. A strain, comprising a link provided integrally with a suspension member and also with a member of annular form having a bearing-surface, a bolt provided with a shoulder and with a portion free to extend through said member of annular form, a locking device engaging said bolt and also engaging an outer portion of said annular bearing member, and a sleeve of insulating material provided with a flange, said sleeve engaging said bolt and also engaging the annular portion of said annular member, the flange of said sleeve engaging said bearing-surface of said annular member and also engaging said locking device.

5. A strain, comprising a stirrup-shaped link provided with a suspension member and also provided with a member of annular form having a bearing-surface disposed perpendicularly to the general length of said link, a bolt provided with a suspension member and also with a shoulder, said bolt having a portion free to extend through said member of annular form, a locking device engaging said bolt, a detachable insulating member engaging said shoulder of said bolt and also engaging an outer portion of said member of annular form, and a sleeve of insulating material provided with a flange and detachably engaging said bolt and also engaging the inner portion of said annular member, a flange of said sleeve engaging said bearing-surface of said annular member and also engaging said locking device.

6. A strain, comprising a substantially stirrup-shaped link provided with a suspension member and with a portion of annular form having a bearing-surface and a clamping-surface, a bolt provided with a suspension member and with a shoulder, said bolt having a stem free to extend through said portion of annular form, and also having a mutilation, a detachable locking device engaging said bolt, a detachable insulating member engaging said shoulder of said bolt, and also engaging said portion of annular form, and a sleeve of insulating material engaging said bolt and said annular portion of said stirrup-shaped link, said sleeve of insulating material being provided with a flange engaging said annular portion and also engaging said locking device.

7. A strain, comprising a substantially stirrup-shaped link having an annular portion provided with an aperture and with a suspension member, said annular portion having a bearing-surface and a clamping-surface, a bolt provided with a stem free to extend through said aperture and also provided with a shoulder too large to pass through said aperture, a locking device engaging said bolt within said link, a detachable insulating member engaging said shoulder of said bolt, and also engaging said clamping-surface, a sleeve of insulating material engaging said bolt and provided with a flange engaging said bearing-surface, and a locking member engaging said stem and also engaging said flange.

8. A strain, comprising a substantially stirrup-shaped link having a portion provided with an aperture and also having a suspension member, said portion having said aperture being provided with a bearing-surface and a clamping-surface, a bolt provided with a threaded stem free to extend through said aperture, said bolt being also provided with a shoulder too large to pass through said aperture, a locking device engaging said bolt within said link, an insulating member detachably engaging said shoulder of said bolt and also engaging said clamping-surface, a sleeve of insulating material engaging said bolt and provided with a flange engaging said bearing-surface, a locking member engaging said stem and also engaging said flange, and an outer covering of insulating material in the form of a spheroid.

9. A strain, comprising a stirrup-shaped link, having a portion provided with an aperture, and also having a suspension member, said portion being provided with a bearing-surface and a clamping-surface, a bolt provided with a threaded stem free to extend through said aperture, and also provided with a shoulder, said shoulder being too large to pass through said aperture, a locking device engaging said bolt within said link, an insulating member detachably engaging said shoulder of said bolt and also engaging said clamping-surface, and a sleeve of insulating material engaging said bolt and provided with a flange engaging said bearing-surface.

In testimony whereof I have signed my name to this specification in the presence of two subscribing witnesses.

LOUIS STEINBERGER.

Witnesses:
 WALTON HARRISON,
 EVERARD BOLTON MARSHALL.